United States Patent
Beechie et al.

[11] Patent Number: 6,029,624
[45] Date of Patent: Feb. 29, 2000

[54] METHOD FOR PREVENTING POWERTRAIN VIBRATION

[75] Inventors: Brian E. Beechie, Farmington Hills; James W. Yip, Pinckney, both of Mich.

[73] Assignee: DaimlerChrysler Corporation, Auburn Hills, Mich.

[21] Appl. No.: 09/213,954

[22] Filed: Dec. 17, 1998

[51] Int. Cl.[7] ............................................. F02D 9/06
[52] U.S. Cl. ................................... 123/327; 123/436
[58] Field of Search ............................. 123/327, 436

[56] References Cited

U.S. PATENT DOCUMENTS

| | | |
|---|---|---|
| 4,430,973 | 2/1984 | Miyagi . |
| 4,438,744 | 3/1984 | Hasegawa . |
| 4,491,107 | 1/1985 | Hasegawa et al. ...................... 123/327 |
| 4,700,679 | 10/1987 | Otobe et al. ............................. 123/327 |
| 4,788,954 | 12/1988 | Otobe et al. . |
| 4,989,563 | 2/1991 | Fukutomi et al. . |
| 5,040,506 | 8/1991 | Yamane . |
| 5,134,978 | 8/1992 | Binnewies et al. ...................... 123/327 |
| 5,213,076 | 5/1993 | Umemoto et al. ...................... 123/327 |
| 5,289,807 | 3/1994 | Yonekawa . |
| 5,934,247 | 8/1999 | Hashimoto et al. .................... 123/327 |

*Primary Examiner*—John Kwon
*Attorney, Agent, or Firm*—Roland A. Fuller, III

[57] ABSTRACT

A method for bypassing a controlled quantity of airflow around a throttle body of an internal combustion engine of a motor vehicle during periods of sudden deceleration of the vehicle. The method makes use of a bypass valve having an input end in communication with an air inlet of a throttle body of the engine and an outlet in communication with an air inlet of the intake manifold of the engine. When sudden closing of the throttle is sensed, or when the throttle is closed, the bypass valve is opened to a degree sufficient to enable an additional quantity of air to flow therethrough and into the inlet of the intake manifold. The invention significantly reduces the drop in engine rpm experienced during sudden deceleration of the vehicle, to thereby substantially reduce or eliminate powertrain vibration that results during sudden deceleration.

11 Claims, 3 Drawing Sheets

METHOD FOR PREVENTING POWERTRAIN VIBRATION

TECHNICAL FIELD

This invention relates to airflow intake systems for internal combustions of motor vehicles, and more particularly to an airflow control system for eliminating objectionable powertrain vibration during deceleration of a vehicle due to closing of a throttle body of the engine during deceleration of the vehicle.

DISCUSSION

A motor vehicle incorporating an internal combustion engine typically makes use of a fuel injection mechanism including a throttle body through which air flows. The airflow flowing through the throttle body is mixed with fuel from one or more fuel injectors and is then directed into an intake manifold where it is eventually distributed into the combustion chambers of the engine and combusted. When going from an open throttle to a closed throttle condition, such as when a driver's foot is lifted off of the accelerator pedal of the vehicle, the sudden, complete interruption of airflow through the throttle body as its throttle valve closes can cause undesirable oscillations in the powertrain of the vehicle if the vehicle is equipped with a manual transmission. If the vehicle is equipped with an automatic transmission, these undesirable powertrain vibrations can still occur.

It would therefore be highly desirable if a quantity of airflow could still be provided into the intake manifold of the vehicle engine during instances where sudden deceleration (i.e., sudden engine rpm drop) of the vehicle occurs. The small degree of airflow provided to the intake manifold would serve to significantly reduce or eliminate the objectionable powertrain vibrations that are typically experienced when suddenly decelerating.

It would also be highly desirable if such a system could be employed which is extremely low in cost and does not add significantly to the complexity of the vehicle engine, its dimensions or its weight.

It would still be highly desirable to provide some means by providing a small quantity of airflow into the intake manifold of the engine of the vehicle during periods of sudden deceleration, where the apparatus for supplying the small additional quantity of airflow to the intake manifold can be controlled easily with existing electronic hardware of the vehicle.

SUMMARY OF THE INVENTION

The present invention relates to a method for supplying a small additional quantity of airflow into an intake manifold of an internal combustion engine of a motor vehicle during periods of sudden deceleration of the vehicle. The controlled amount of additional airflow into the intake manifold is accomplished by providing a bypass valve disposed between an air inlet and the intake manifold so as to bypass a desired quantity of airflow around the closed throttle valve into an inlet of an intake manifold. More preferably, the bypass valve is disposed between an air inlet of a throttle body of the vehicle engine and the intake manifold of the engine. In one preferred embodiment the bypass valve comprises an idle air control motor (IACM).

The bypass valve functions to admit a small additional quantity of airflow into the intake manifold when sudden deceleration of the vehicle occurs. The sudden deceleration is detected by monitoring when the throttle valve is closed or closing. When the throttle is closed or when throttle closing is occurring, the bypass valve is actuated to admit an additional quantity of air into the intake manifold. In this manner the objectionable powertrain vibration that typically occurs when the airflow into the intake manifold is completely interrupted is prevented.

In a preferred embodiment the bypass valve is disposed so as to be in communication with an air inlet of the throttle body and the intake manifold, and also to bypass a very small quantity of the airflow flowing through the throttle body into the intake manifold during normal operation of the vehicle when the throttle of the throttle body is in an open condition. Thus, airflow is through the throttle body and also through the bypass valve. When the closing or closed throttle is detected, the bypass valve is opened a further degree to allow an even greater quantity of airflow therethrough into the intake manifold.

In the preferred embodiment, barometric pressure and air temperature are further sensed and used as factors in determining the proper amount of additional airflow to be admitted through the bypass valve into the intake manifold.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENTS

Figure 1:
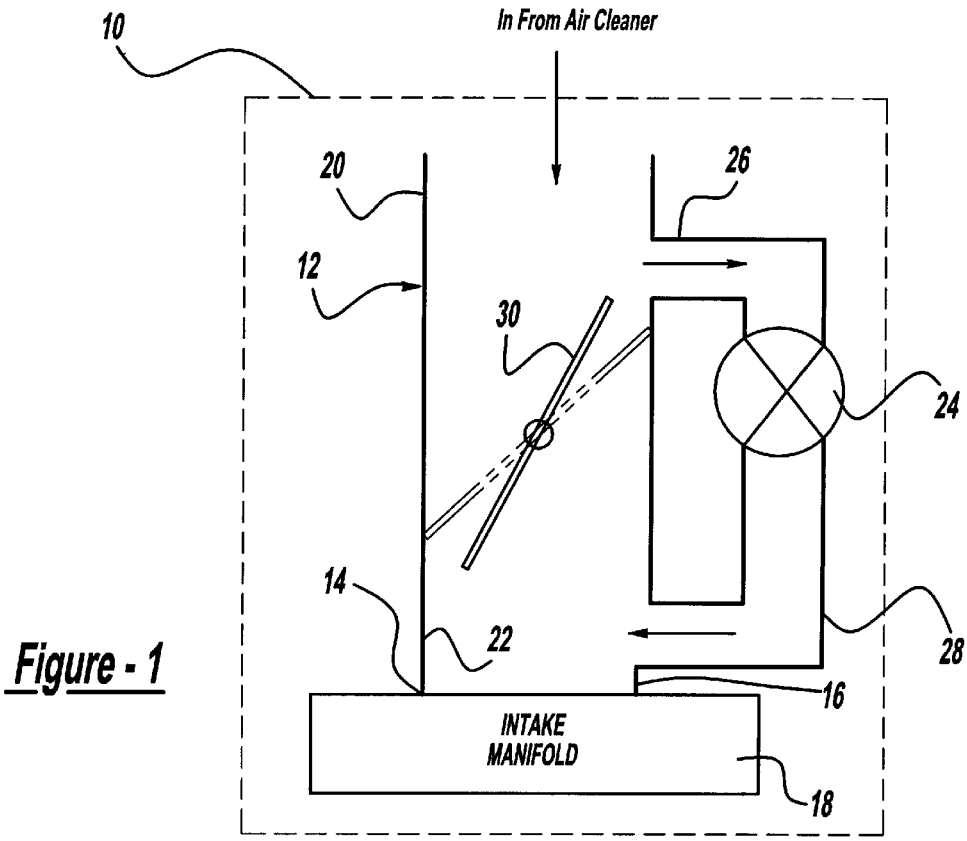
FIG. 1 is a simplified schematic drawing of a throttle body coupled to an intake manifold of an engine of a motor vehicle illustrating the bypass valve coupled in one preferred embodiment between an inlet of the throttle body and an inlet of the intake manifold.

Referring to FIG. 1, there is shown an engine 10 having a throttle body 12 having an outlet 14. The throttle body 12 is coupled to an inlet port 16 of an intake manifold 18 of the engine 10. Coupled between an inlet 20 of the throttle body 12 and an outlet 22 thereof is a bypass valve 24 in accordance with a preferred embodiment of the present invention. The bypass valve 24 has an input conduit 26 and an output conduit 28 which are coupled between the air inlet 20 and the outlet 22 of the throttle body 14 so as to bypass a throttle valve 30 disposed within the throttle body 14. The bypass valve 24 thus forms a means for bypassing airflow which would otherwise enter the throttle body 14 but which would be blocked by the valve 30 if the valve is in a closed position. Thus, the valve 24 enables an additional quantity of airflow to be directed (i.e., bypassed) around the valve 30 and directed into the inlet 16 of the intake manifold 18 when desired.

In one preferred embodiment the valve forms an idle air control stepper motor which is controlled by the vehicle electronics, such as by an engine control module (ECM) of the vehicle. Alternatively, a linear solenoid air bypass valve could be incorporated. However, any valve which is capable of being opened to a precise degree by a suitable control signal could be utilized.

The bypass valve 24 functions to admit a small quantity of additional airflow into the inlet 16 of the intake manifold 18 when the valve 30 is in the closed position, illustrated in phantom in FIG. 1, to prevent the objectionable powertrain vibrations that typically occur when the valve 30 is closed, such as during deceleration of the vehicle. The required quantity of additional airflow is sometimes referred to in the art as the "bobble" airflow.

Determining the bobble airflow involves the formulas set forth below:

DEFINITIONS

Corrected Throttle Flow: the airflow through the throttle body corrected for barometric pressure and temperature.

Corrected bobble airflow$_{captured}$: Airflow through the throttle body on the first cycle by the processor of the ECM after the throttle is sensed closing.

Base airflow at idle: The amount of airflow required to maintain unloaded idle engine speed.

Actual bobble airflow: The calculated amount of airflow required for bobble compensation.

Decrement airflow: Amount of airflow required to decrement or remove bobble airflow.

Hold period: Value obtained from a table of hold time (Y-axis) v. (engine speed/vehicle speed) (X-axis).

Loop Time: Time for processor of vehicle ECM to complete one cycle.

Throttle Follower airflow: Corrected throttle airflow multiplied by Perair.

Perair: A throttle multiplier value obtained from a table indicating (insert details).

The following formulas are used to determine the actual bobble airflow:

Bobble airflow=Corrected throttle airflow;

Corrected bobble airflow=(bobble airflow)*(bobble throttle flow multiplier)

where the bobble throttle flow multiplier is obtained from a table of throttle flow v. (bobble throttle flow multiplier)

Decrement airflow=Corrected bobble airflow$_{captured}$−Corrected bobble airflow$_{captured}$·hold period/loop time where "hold period"=a value taken from a table of hold time v. (engine speed/vehicle speed)

Actual bobble airflow=Corrected bobble airflow−decrement airflow

Figure 2:
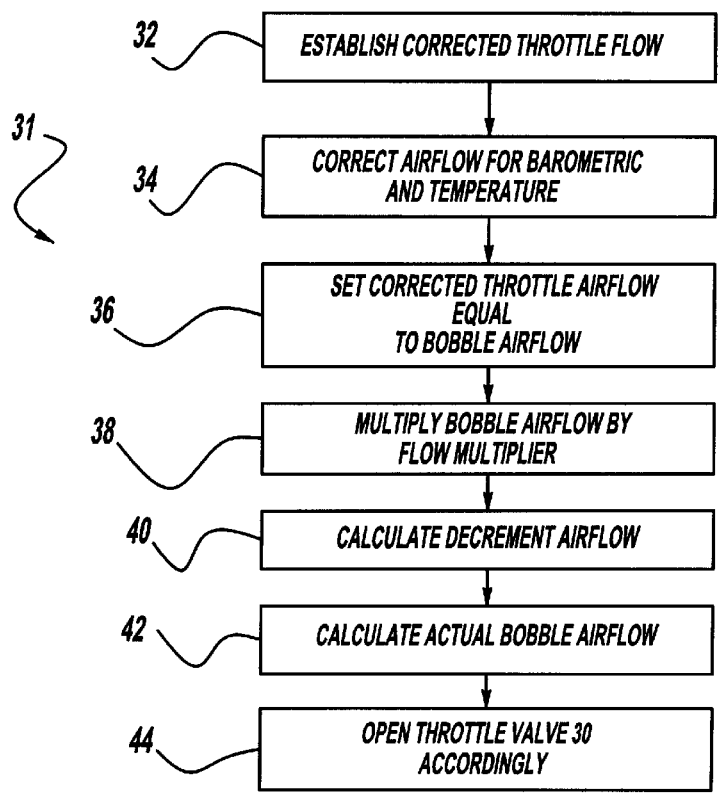
FIG. 2 is a flowchart illustrating the steps of the method of the present invention.

Total airflow delivered=Base airflow at idle+actual bobble airflow+throttle follower airflow Referring now to FIG. 2, a flowchart 31 is illustrated setting forth the steps in calculating the actual bobble airflow. Initially, at step 32, the corrected throttle airflow is captured as the throttle valve 30 first closes. It is corrected for barometric pressure and temperature at step 34 and the corrected throttle airflow is then set equal to the bobble airflow, as indicated at step 36.

At step 38, the bobble airflow value is multiplied by the bobble throttle flow multiplier obtained from the table stored in memory of the vehicle's ECM. The decrement airflow is then calculated at step 40 and then the actual bobble airflow is calculated at step 42. Finally, the throttle valve 30 is opened an additional degree to permit the actual bobble airflow quantity to be admitted into the inlet 16 of the intake manifold 18.

Figure 3:
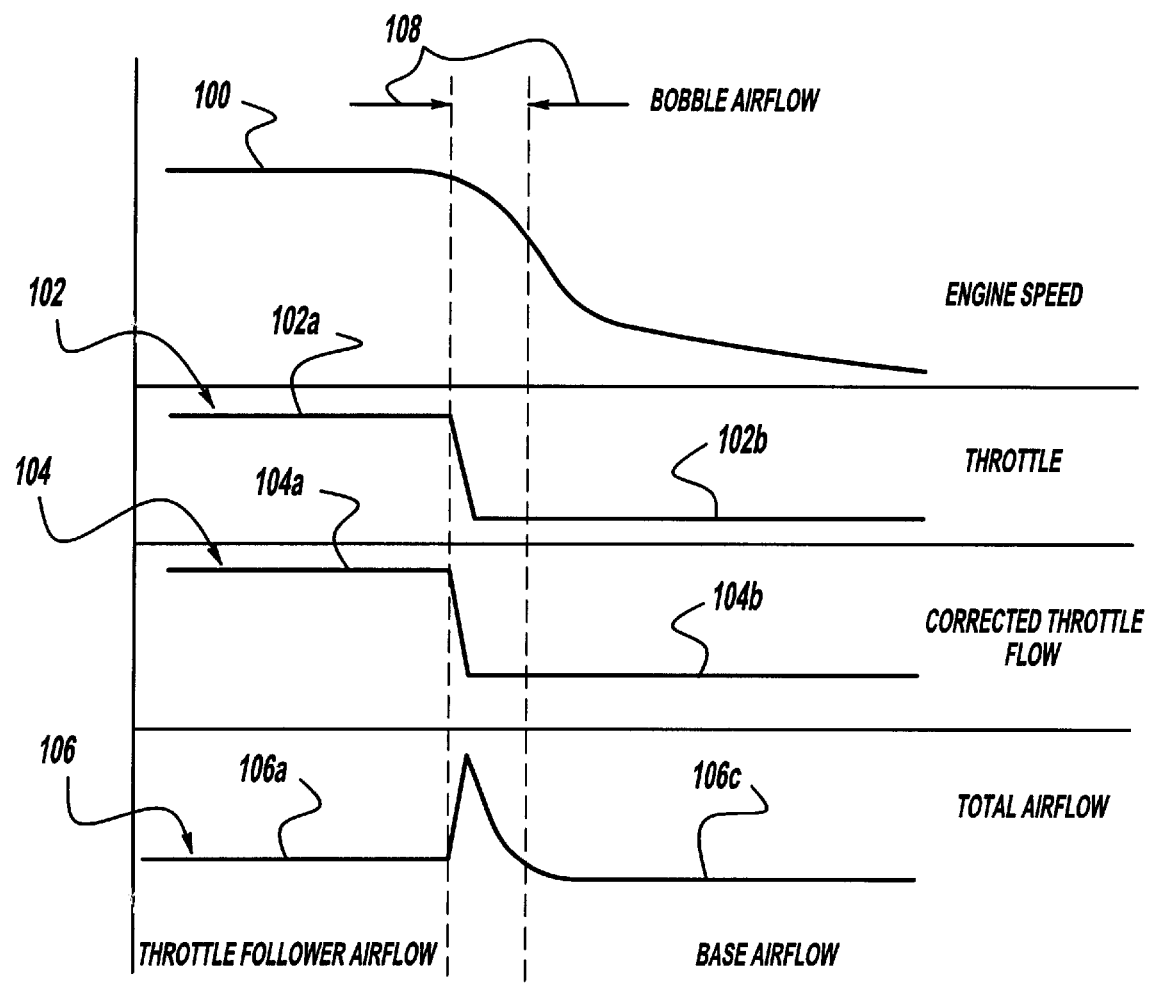
FIG. 3 is a series of waveforms representative of various parameters illustrating the relationship of the bobble airflow provided by the bypass valve of the present invention in relation to various other engine parameters.

Referring now to FIG. 3, the engine speed is represented by waveform 100, the throttle position is represented by waveform 102, the corrected throttle flow is represented by waveform 104 and the total airflow is represented by waveform 106. The period defined by arrows 108 represents when the engine 10 suddenly decelerates. Waveform 102 illustrates this more clearly. Portion 102a of waveform 102 represents the throttle 30 in the open position shown in FIG. 1. Portion 102b represents the throttle in the closed position which is shown in phantom in FIG. 1. Waveform 104 includes portion 104a which represents the corrected throttle airflow through the throttle body 14 when the valve 30 is in the open position. Portion 104b represents the corrected throttle airflow into the intake manifold 16 when the valve 30 is moved into the closed position. The waveform 106 includes a portion 106a which represents the airflow through the conduit 28 of the bypass valve 24 when the valve 30 is in the open position. Portion 106b represents the bobble airflow into the intake manifold inlet 16 during the period of sudden deceleration defined by arrows 108. Portion 106c of the waveform 106 represents the base airflow into the intake manifold inlet 16 which is required to maintain the desired engine idle speed.

Referring further to waveform 106, it will be noted that a small degree of airflow is present, as indicated by portion 106a of the waveform, even when the throttle valve 30 (FIG. 1) is in the open position. When deceleration occurs, the bobble airflow is added to the existing airflow already passing through the conduit 28 (FIG. 1). A short predetermined time thereafter, the bypass valve 24 is closed substantially, but not entirely, to permit the base airflow which is represented by portion 106c of the waveform 106.

Figure 4:
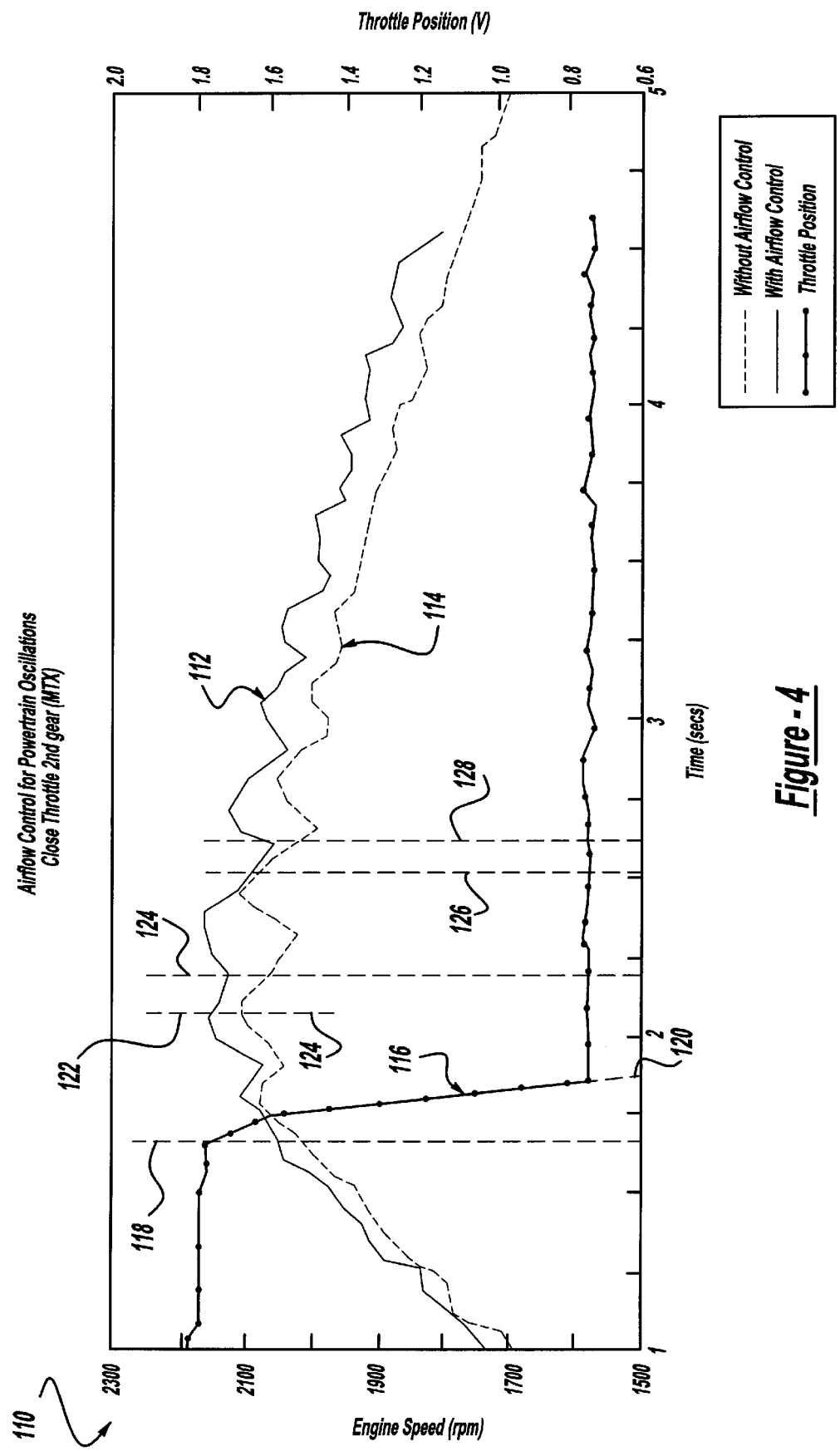
FIG. 4 is a graph illustrating the improvement in maintaining engine speed during sudden vehicle deceleration provided by the present invention.

Referring now to FIG. 4, a graph 110 illustrating the improvement in the reduction of engine speed as a result of the bobble airflow is illustrated. Waveform 112 represents the engine speed of the engine 10 while a transmission (not shown) associated with the engine 10 is operating in second gear and the throttle 12 is suddenly closed. Waveform 114 indicates the engine speed without the airflow control provided by the present invention. Waveform 116 represents the throttle position. At point 118 the throttle begins to abruptly close, and at point 120 the throttle is fully closed. As can be seen between lines 122 and 124 denoting a first time interval, the reduction in the drop of engine speed is significant when the drop without airflow control (waveform 114) is compared with the drop wherein the bobble airflow is provided (waveform 112). The reduction in the drop or engine rpm is further illustrated during the time interval between lines 126 and 128. The reduction in the drop of engine rpm in these instances is about 66% between lines 122 and 124 and about 20% during the time interval demarcated by lines 126 and 128.

The present invention therefore forms a means by which a small additional quantity of air is bypassed around the throttle body and into an inlet of an intake manifold during periods of sudden deceleration, to thereby help to substantially reduce or eliminate the objectionable powertrain vibrations that often accompany such sudden deceleration. The apparatus adds very little to the overall cost of a typical vehicle internal combustion engine, requires little additional space in the engine compartment of the vehicle, and can be controlled by a suitable onboard computer of the vehicle such as the vehicle's engine control module (ECM).

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A method for reducing powertrain vibration in a motor vehicle having an internal combustion engine, wherein the vibration is caused by a transition from an open throttle condition to a closed throttle condition, by controlling the airflow flowing through a throttle body to an intake manifold of said engine during said transition, said method comprising:

disposing an air bypass valve to communicate with an upstream side and a downstream side of said throttle body so as to be capable of diverting at least a portion of said airflow entering said throttle body into said intake manifold;

determining said airflow flowing through said throttle body when a throttle valve of said throttle body is in said open throttle condition;

allowing a portion of said airflow through said throttle body to be bypassed through said air bypass valve when said throttle body is in said open throttle condition;

detecting when said engine decelerates, thereby indicating a decelerating condition;

determining a percentage of said airflow required to prevent said engine from experiencing said powertrain vibration during said condition of deceleration; and opening said air bypass valve to a greater degree for a predetermined time sufficient to enable an additional quantity of said airflow in accordance with said percentage to flow through said air bypass valve to prevent said powertrain vibration.

2. The method of claim 1, wherein said bypassing step comprises bypassing said airflow through an input airflow control motor (IACM).

3. The method of claim 2, wherein said IACM receives a portion of said airflow flowing into said throttle body when said throttle body is in an open condition.

4. The method of claim 1, wherein said airflow through said throttle body is corrected for temperature before determining said percentage of said bypassed airflow.

5. The method of claim 1, wherein said airflow through said throttle body is corrected for barometric pressure before determining said percentage of said bypassed airflow.

6. A method for reducing powertrain vibration in a motor vehicle having an internal combustion engine, wherein the vibration is caused by a transition from an open throttle condition to a closed throttle condition, by controlling the airflow flowing through a throttle body to an intake manifold of said engine during said transition, said method comprising:

disposing an air bypass valve to communicate with an upstream side and a downstream side of said throttle body so as to be capable of diverting at least a portion of said airflow entering said throttle body into said intake manifold;

calculating said airflow flowing through said throttle body when said throttle body is in said open throttle condition;

allowing a portion of said airflow through said throttle body to be bypassed through said air bypass valve when said throttle body is in said open throttle condition;

detecting when said engine decelerates, thereby indicating a deceleration condition;

determining a percentage of said airflow required to prevent said engine from experiencing said powertrain vibration during said condition of deceleration; and opening said air bypass valve to a greater degree for a predetermined time sufficient to enable an additional quantity of said airflow in accordance with said percentage to flow through said air bypass valve to prevent said powertrain vibration.

7. The method of claim 6, further comprising determining a temperature of said airflow flowing through said throttle body prior to determining said percentage of said airflow required to bypassed through said air bypass valve to prevent said powertrain vibration.

8. The method of claim 6, further comprising determining barometric pressure and using said barometric determination value when determining said airflow required to be bypassed through said air bypass valve to prevent said powertrain vibration.

9. The method of claim 6, further comprising the steps of:

determining a temperature of said airflow flowing through said throttle body prior to determining said percentage of said airflow required to be bypassed through said air bypass valve to prevent said powertrain vibration; and determining barometric pressure and using said barometric pressure determination when determining said airflow required to be bypassed through said air bypass valve to prevent said powertrain vibration.

10. The method of claim 6, wherein said percentage of said airflow required to be bypassed is determined in part by determining said airflow through said throttle body and assigning same a value, and multiplying said value by a multiplier relating to a ratio of engine speed to vehicle speed.

11. A method for reducing powertrain vibration in a motor vehicle having an internal combustion engine, wherein the vibration is caused by a transition from an open throttle condition to a closed throttle condition, by controlling the airflow flowing through a throttle body to an intake manifold of said engine during said transition, said method comprising:

disposing an air bypass valve to communicate with an upstream side and a downstream side of said throttle body so as to be capable of diverting at least a portion of said airflow entering said throttle body into said intake manifold;

calculating said airflow flowing through said throttle body when said throttle body is in said open throttle condition;

allowing a portion of said airflow through said throttle body to be bypassed through said air bypass valve when said throttle body is in said open throttle condition;

detecting when said engine decelerates, thereby indicating a deceleration condition;

measuring barometric pressure;

determining a temperature of said airflow flowing into said throttle body;

using said temperature and said barometric pressure to determine a percentage of said airflow required to prevent said engine from experiencing said powertrain vibration during said condition of deceleration; and opening said air bypass valve to a greater degree for a predetermined time sufficient to enable said percentage of said airflow to flow through said air bypass valve to prevent said powertrain vibration.

* * * * *